United States Patent [19]

Wain

[11] Patent Number: 4,768,832
[45] Date of Patent: Sep. 6, 1988

[54] ADJUSTABLE-WIDTH SEATING FOR VEHICLES

[75] Inventor: Nicholas D. Wain, Wycombe, England

[73] Assignee: Flight Equipment & Engineering Limited, Buckinghamshire, England

[21] Appl. No.: 920,169

[22] Filed: Oct. 17, 1986

[30] Foreign Application Priority Data

Oct. 18, 1985 [GB] United Kingdom ................ 8525701

[51] Int. Cl.⁴ .............................................. A47C 13/00
[52] U.S. Cl. .................................... 297/414; 297/115
[58] Field of Search ............... 297/411, 414, 415, 416, 297/417, 115, 116, 117, 232

[56] References Cited

U.S. PATENT DOCUMENTS

| | | | |
|---|---|---|---|
| 1,378,704 | 5/1921 | McPartland | 297/414 |
| 3,124,328 | 3/1964 | Kortsch | 297/414 X |
| 3,145,052 | 8/1964 | Morgan | 297/414 X |
| 3,893,729 | 7/1975 | Sherman | 297/115 X |
| 3,926,473 | 12/1975 | Hogan | 297/414 X |
| 4,019,779 | 4/1977 | Hogan | 297/414 X |
| 4,533,175 | 8/1985 | Brennan | 297/115 X |

FOREIGN PATENT DOCUMENTS

1037972 10/1962 United Kingdom.

OTHER PUBLICATIONS

Trans-Australia Arlines, Convertible Seats, 3 Sep. 1979.

*Primary Examiner*—Peter A. Aschenbrenner
*Attorney, Agent, or Firm*—Watson, Cole, Grindle & Watson

[57] ABSTRACT

An adjustable seating unit, particularly for aircraft, comprises a backrest part and a bottom part capable of accommodating either three narrower seats or two wider seats, with intermediate armrests which are movable laterally between positions defining respectively the three narrower seats and the two wider seats. The intermediate armrests are anchored to the seating unit by linkages and complementary components are provided on the intermediate armrests and on the seating unit for selective engagement to locate the intermediate armrests positively in their respective positions.

7 Claims, 2 Drawing Sheets

ADJUSTABLE-WIDTH SEATING FOR VEHICLES

FIELD OF THE INVENTION

In passenger-carrying vehicles, particularly aircraft, it is common to provide seats of different widths for passengers travelling on different classes of fare. For example, a seat provided for a passenger travelling "first class" is usually wider (and also usually designed to provide greater comfort) than seats provided for passengers travelling on the "tourist class" fare.

THE PRIOR ART

Vehicles are commonly used to transport different kinds of passengers on different journeys. When vehicles carry passengers travelling on two or more different fare classes on the same journeys, the number of passengers in each class is likely to vary from one journey to another. It is therefore a common practice to provide an adjustable seating unit comprising a backrest part and a bottom part for a row of seats, with intermediate armrests which are movable laterally so that the number of seats provided by a row, and therefore the width of each seat, can be adjusted between journeys to accommodate passengers in different fare classes. This invention concerns adjustable seating units of this kind, which will for convenience be referred to as "of the kind described".

Typically, a "first class" seat for an aircraft has an overall width about one-and-a-half times the width of a "tourist" class seat. It is therefore convenient to make an adjustable seating unit of the kind described of overall width sufficient to provide a row of three seats for "tourist" class passengers. Fixed armrests are provided at the ends of the unit and two intermediate armrests are provided which can each be located in two alternative positions. In the first position, all four armrests are equally spaced, providing seats for three passengers. In the second position, the two intermediate armrests are each located closer to the centre of the row so as to provide wider seats for two passengers. In one such arrangement, described in British Patent Specification No. 1,037,972, the intermediate armrests each have a plug element which can be inserted into either of two sockets provided in the seat at the two alternative positions.

This arrangement has a disadvantage that the intermediate armrests may be removed from their sockets by passengers. When removed from their sockets they may be misplaced or lost. The present invention avoids this disadvantage.

SUMMARY OF THE INVENTION

According to the present invention an adjustable seating unit of the kind described which is arranged to provide either three narrower seats or two wider seats is characterised in that each intermediate armrest is anchored to the seating unit by a linkage and complementary components are provided on the intermediate armrests and on the seating unit for selective engagement to locate the armrests positively in their respective positions.

BRIEF DESCRIPTION OF THE DRAWINGS

An embodiment of the invention is illustrated by way of example by the accompanying drawing, in which.

DETAILED DESCRIPTION OF PREFERRED EMBODIMENT

Figure 1:
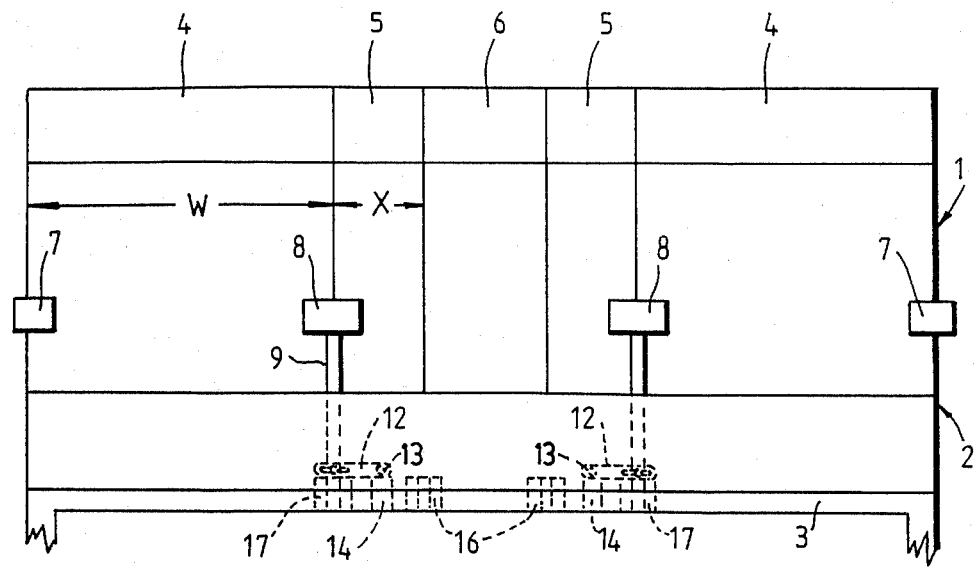
FIG. 1 is a diagrammatic front elevation of a seating unit of the kind described, showing the intermediate armrests in their positions providing seats for three passengers.

The seating unit comprises a backrest part 1 and a bottom part 2, each of width sufficient for three narrower seats, mounted on a support frame 3 (shown only in part). The backrest part 1 is divided into outer sections 4, each of width appropriate for a narrower seat, inner sections 5 of width equal to the difference X between the widths appropriate to the narrower and wider seats, and a middle section 6. The sections 4, 5 and 6 are pivotally connected to the support frame 3 for reclining movement, as is common in such seats, and each inner section 5 can be connected laterally by bolts, not shown, either to the middle section 6 or to the adjacent outer section 4 to provide backrests either for three narrower seats or two wider seats. Conventional control mechanisms, not shown, are included for controlling the reclining movements of the sections.

Figure 2:
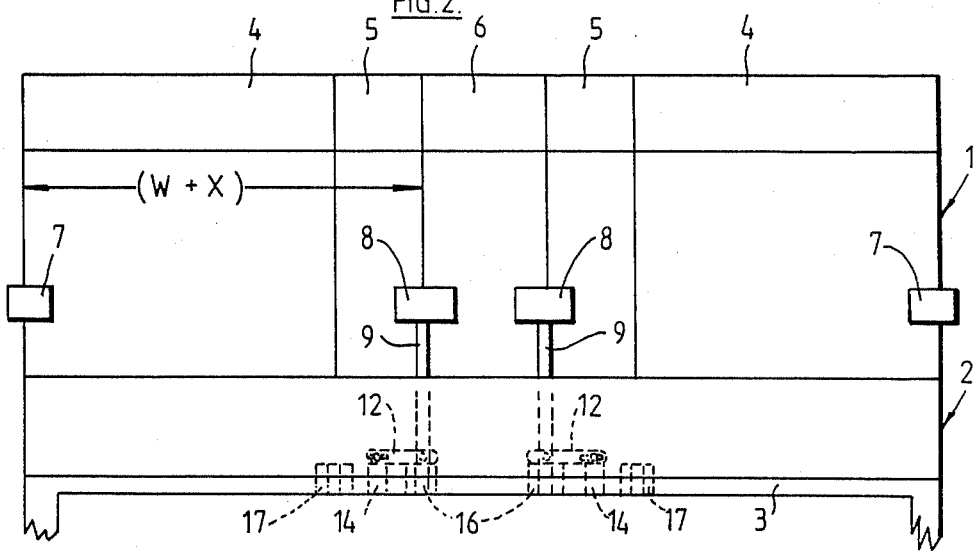
FIG. 2 is a view similar to FIG. 1, showing the intermediate armrests in their positions providing seats for two passengers.

Outer armrests 7 are mounted at each side of the seating unit. Two intermediate armrests 8 are anchored to the support frame 3 by linkages which enable them to be moved laterally between the positions shown in FIG. 1, in which the four armrests are substantially equally spaced apart by distances W appropriate for a narrower seat, and positions shown in FIG. 2 in which they are spaced a distance (W+X) from the outer armrests which is appropriate for wider seats.

Figure 3:
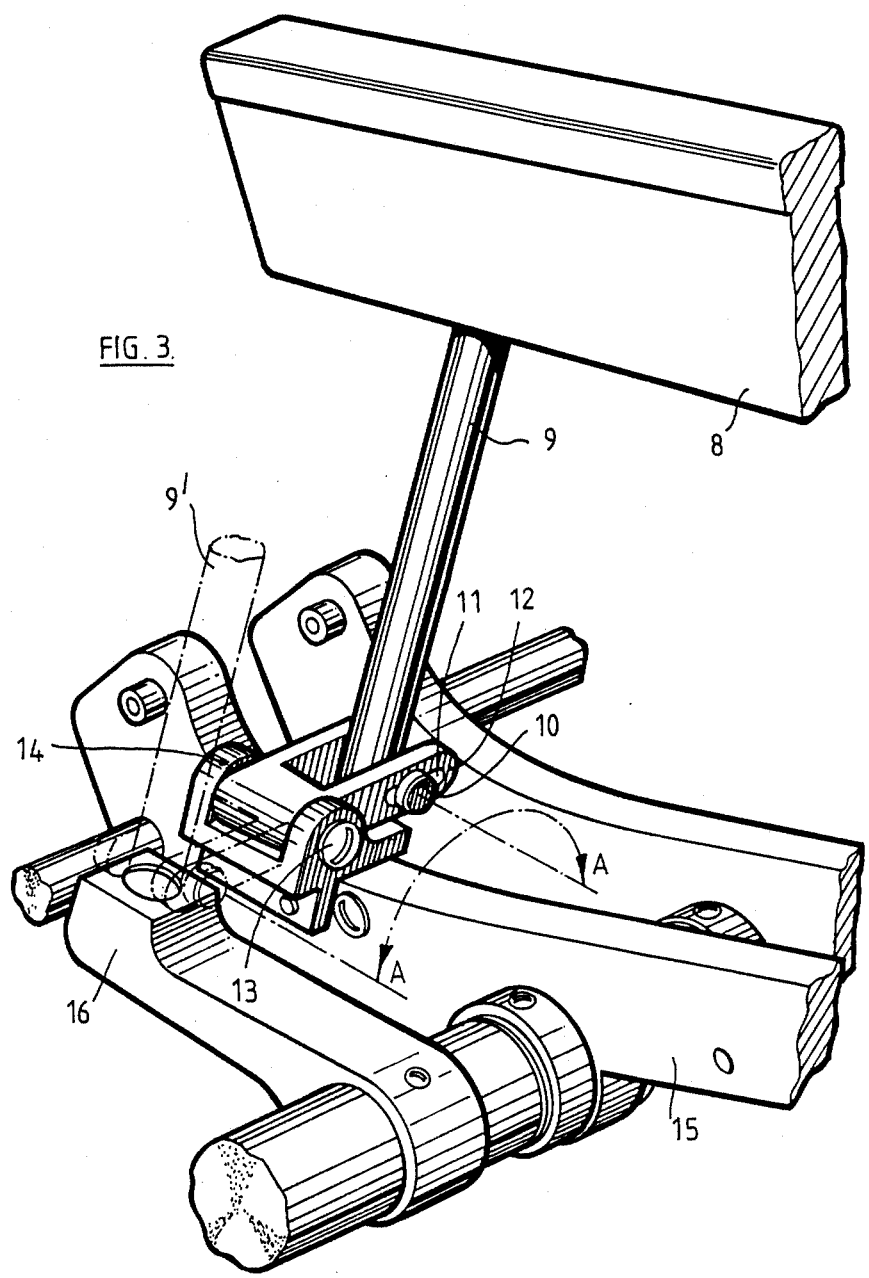
FIG. 3 is a fragmental perspective view of an intermediate armrest and its anchoring linkage.

As most clearly shown in FIG. 3, each intermediate armrest 8 is mounted on a pillar 9, through which passes a pin 10 which passes freely through and is slidable in a slot 11 in a link 12. The respective links 12 are pivotally connected by pins 13, parallel to the pins 10, secured in mounting saddles 14 secured to elements 15 of the support frame 3 which support the bottom part 2 on each side of the middle seat position. By swinging the link 12 about the pin 13, as indicated by the arrows A, whilst keeping the pillar 9 upright, the armrest 8 can be moved between the positions shown in FIGS. 1 and 2.

The pillar 9 extends beyond the pin 13 to form a plug element to engage selectively with socket elements 16, 17 secured to parts of the frame 3 in positions corresponding to the two positions of the intermediate armrests. The socket element 16 is shown in FIG. 3, but in that figure the socket element 17, secured to the side of the element 15, is concealed.

Engagement of the plug element of the pillar 9 with the respective socket elements 16, 17, provides rigid location of the intermediate armrests 8 in their respective positions and the linkages comprising the pins 10 and 13, the links 12 and the mounting saddles 14 anchor the armrests 8 against removal and loss but enable them to be moved quickly and easily between their two positions.

I claim:

1. An adjustable seating unit for use in a vehicle, said adjustable seating unit comprising
   a support frame which is mountable in a vehicle,
   a seat and a backrest mounted on said support frame, said seat and seat backrest each having opposite sides and defining between said opposite sides at least two seating areas for people abreast, first and second spaced apart linkage systems, each linkage system comprising a link pivotally connected to said support frame, first and second intermediate armrests respectively pivotally connected to said links of said first and second linkage systems so as to divide said seat and said backrest into said at least two seating areas for people abreast, each of said two seating areas being defined by the location of the associated intermediate armrest and the adjacent sides of the seat and the backrest, each of said linkage systems permitting the intermediate armrest attached thereto to be moved between first and second predetermined positions in parallel planes spaced relative to the adjacent sides of the seat and the backrest and thus either to enlarge or to reduce the seating area defined thereby, and engagement means connected to said support frame and cooperable with said first and second linkage systems to locate said intermediate armrests either in their first or second predetermined positions.

2. An adjustable seating unit as claimed in claim 1, wherein said link of each of said first and second linkage systems is pivoted about a first pin mounted on said support frame so as to extend substantially perpendicularly to said backrest.

3. An adjustable seating unit as claimed in claim 2, wherein each of said first and second linkage systems includes a mounting saddle secured to said support frame, said first pin being mounted in said mounting saddle, and a second pin mounted in said link connecting the respective intermediate armrest to the linkage system.

4. An adjustable seating unit as claimed in claim 3, wherein each of said first and second linkage systems includes a pillar which is rotatably connected near a lower end thereof to said second pin and which supports an associated intermediate armrest at an upper end thereof; said pillar being rotatable about said second pin as said link is rotatable about said first pin to move the associated intermediate armrest between its first and second predetermined positions.

5. An adjustable seating unit as claimed in claim 4, wherein a lower end of each said pillar forms a plug end which extends beyond the second pin to which the pillar is rotatably attached, and wherein said engagement means includes socket elements secured to said support frame on opposite sides of each of said mounting saddle to receive selectively a plug end of the associated pillar when the respective intermediate armrest is in its first and second predetermined positions.

6. An adjustable seating unit as claimed in claim 5, including side armrests fixedly attached to said support frame at the opposite sides of the seating unit.

7. An adjustable seating unit as claimed in claim 1, wherein said seat provides seating areas for three people abreast, and wherein the seating areas have varying widths, depending on the positions in which said first and second intermediate armrests are located.

* * * * *